(12) United States Patent
Schüßler et al.

(10) Patent No.: US 7,654,614 B2
(45) Date of Patent: Feb. 2, 2010

(54) LUMBAR SUPPORT AND CONTROL DEVICE FOR A LUMBAR SUPPORT AND METHOD FOR CONTROLLING A LUMBAR SUPPORT OF A MOTOR VEHICLE (75) Inventors: Markus Schüßler, Zeitiofs (DE); Thomas Rösch, Querfurt (DE); Ingo Carl, Gochsheim (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 12/129,178

(22) Filed: May 29, 2008

(65) Prior Publication Data
US 2008/0224517 A1 Sep. 18, 2008

Related U.S. Application Data (62) Division of application No. 10/970,832, filed on Oct. 21, 2004, now Pat. No. 7,398,142.

(30) Foreign Application Priority Data
Oct. 23, 2003 (DE) .............................. 203 16 371 U (51) Int. Cl.
*A47C 7/40* (2006.01)
*G06F 7/00* (2006.01)
(52) U.S. Cl. ..................... 297/284.4; 701/36; 701/49
(58) Field of Classification Search ............... 701/36, 701/45–49; 297/284.4, 217.3, 284.1
See application file for complete search history.

(56) References Cited
U.S. PATENT DOCUMENTS

| 4,655,505 A | 4/1987 | Kashiwamura et al. |
| 4,748,972 A | 6/1988 | Hasegawa |
| 4,858,992 A | 8/1989 | LaSota |
| 4,924,163 A | 5/1990 | Sakamoto et al. |
| 5,127,708 A | 7/1992 | Kishi et al. |
| 5,243,267 A | 9/1993 | Ogasawara |
| 6,049,748 A | 4/2000 | Newman et al. |
| 6,243,635 B1 | 6/2001 | Swan et al. |
| 7,172,247 B2 | 2/2007 | Beloch et al. |

(Continued)

FOREIGN PATENT DOCUMENTS

DE 40 22 423 A1 1/1991

(Continued)

*Primary Examiner*—Milton Nelson, Jr.
(74) *Attorney, Agent, or Firm*—Christie, Parker & Hale, LLP (57) ABSTRACT Lumbar support and control device of a lumbar support and method for controlling a lumbar support of a motor vehicle. An electric control device is provided for a lumbar support which has a drive coupled mechanically to an adjusting mechanism for setting the seat contour of the lumbar support. The control device has at least one computer unit which controls a massaging movement of the lumbar support whereby the massaging movement is characterized through several predefinable ideal speeds. Several ideal speeds for one or more adjusting directions of the lumbar support are controllable through the computer unit. For control by the ideal speeds a drive moment of the drive is adapted to an actual load of the drive so that the massaging movement can be controlled substantially independent of the actual time-changeable or locally variable load. The drive moment is consequently changeable through the control device.

22 Claims, 3 Drawing Sheets

U.S. PATENT DOCUMENTS

| | | |
|---|---|---|
| 2003/0075959 A1 | 4/2003 | Xue et al. |
| 2003/0085599 A1 | 5/2003 | McMillen |

FOREIGN PATENT DOCUMENTS

| | | |
|---|---|---|
| DE | 43 13 757 A1 | 11/1994 |
| DE | 197 13 378 C1 | 7/1998 |
| DE | 100 63 478 A1 | 7/2002 |
| DE | 101 45 181 A1 | 10/2002 |
| EP | 0 698 360 B1 | 2/1996 |
| EP | 1 389 559 A2 | 2/2004 |
| GB | 2 144 984 A | 3/1985 |
| WO | WO 95/19123 A1 | 7/1995 |
| WO | WO 03/031222 A1 | 4/2003 |

LUMBAR SUPPORT AND CONTROL DEVICE FOR A LUMBAR SUPPORT AND METHOD FOR CONTROLLING A LUMBAR SUPPORT OF A MOTOR VEHICLE

CROSS-REFERENCE TO RELATED APPLICATION(S)

This application is a divisional of allowed U.S. Application Ser. No. 10/970,832 filed Oct. 21, 2004 now U.S. Pat. No. 7,398,142 which claims priority of German Patent Application 203 16 371.0 filed on Oct. 23, 2003, the disclosures of which are incorporated fully herein by reference.

The invention relates to a lumbar support, a control device for controlling a lumbar support, a method for controlling a lumbar support and a data carrier on which a program is stored for carrying out a lumbar support control.

The use of supports for motor vehicle seats which can be shaped according to anatomical specifications is continuing to rise. Apart from supports which enable the thighs to be supported without too much pressure the so-called lumbar supports are of particular importance. Through the preferred forward bent posture of the seated occupant the natural forwardly directed concave shape of the spinal column becomes replaced by a substantially convex rearwardly curved shape so that apart from a more rapid onset of fatigue there is also an undesirable deformation of the spinal discs. In order to avoid this undesirably bad posture motor vehicle seats are fitted with lumbar supports. Lumbar supports of this kind should be designed vertically adjustable in order to adapt to the different back lengths and thus different heights of the lumbar support. Normally such lumbar supports are covered with a padding of the vehicle seat. This padding is for this purpose filled for example with foam.

Different technical styles of lumbar supports are known. One form comprises an inflatable cylinder provided in the region of the lumbar support. This pneumatic lumbar support adjustment is known for example from U.S. Pat. No. 4,655,505. Several air chambers can be governed in sequence through corresponding valves and the pressure in the air chambers can be reduced by means of an outlet valve or can be raised through a pump assembly and measured by means of a pressure sensor.

A further lumbar support is designed so that two parts connected together can be moved up to or away from each other along a guide. A variable curvature is not possible so that a support of the lumbar support is only provided in the narrow region of the highest position so that only one or two vertebrae are supported. A lumbar support of this kind is described by way of example in WO 95/19123.

A further embodiment of lumbar support has a substantially flat surface area support part, with the faces either having apertures or individual support elements arranged side by side which where necessary are designed to taper outwards from the middle. This flat surface support part can be moved with its two end areas up towards each other so that a curvature thereof can be achieved. A desired asymmetric shape, corresponding substantially to a lumbar support can be achieved through variable thicknesses according to EP 0 698 360 B.

The lumbar supports described above are as a rule connected to a frame, for example of the backrest of the vehicle seat. Here the support part of the lumbar support is connected for example to a further frame which has two outer supports running parallel to the spine and along which slide elements can be moved or on which cross supports for the curving support part are fixed in position.

From WO 95/19123 a lumbar support is known which has no support part which can be curved but two arms which are attached to each other for articulated movement. The ends of the arm parts can be moved towards each other and the other ends are connected through a rail having two cylindrical sockets.

Apart from a manual adjustment of such lumbar supports, also called backrest devices, electrically or pneumatically adjustable lumbar support adjusting devices are known which enable an electrically controlled adjustment of the desired shape. These electrically controlled adjusters are operated for example by a button or switch. The adjustment in the case of the said lumbar supports is bound up with the mechanical configuration thereof.

An electric control of a lumbar support adjusting device of this kind is known from DE 43 13 757 A1 and U.S. Pat. No. 5,243,267. This enables apart from the manual control of the desired support position a massaging effect to be obtained in that a motor repeatedly and periodically generates a forward and backward movement of the lumbar plate within a predetermined time interval. For a special massaging effect the motor in U.S. Pat. No. 5,243,267 is controlled in a stepped operation. The motor is thereby connected to the supply voltage in dependence on the values of a Fourier sequence in one or other direction in certain time intervals with corresponding polarity and switched on and off to generate a massaging movement.

The object of the invention is therefore to provide an electric control device, a lumbar support and a method for controlling a lumbar support of a motor vehicle seat which has the best possible comfort functions with a simple mechanical construction.

This is achieved through the method having the features of claim 1, through the control device having the features of claim 15, and through the lumbar support having the features of claim 25 or claim 28. Advantageous further developments of the invention will be apparent in the sub-claims.

According to this a method is provided here for controlling a drive of a lumbar support of a motor vehicle seat. The drive has for this purpose preferably an electric motor, gearing and an adjusting mechanism. A massaging movement of the lumbar support is controlled by providing several different ideal speeds and/or ideal moments which characterise a massage shape of the massaging movement. By different ideal speeds is thereby meant that they differ in terms of amount. The massaging movement advantageously has several successive ideal speeds and ideal accelerations which cause a uniform movement of the lumbar support. By ideal speed is thereby meant for example an ideal speed of the drive motor or an ideal speed of the part which is to be adjusted. Ideal moments are advantageously proposed in addition or in combination therewith. An excess moment is the difference from the momentary drive moment and the counteracting sluggish moment. An ideal excess moment is provided for example in the region of the mechanical stops in order to restrict the mechanical strain in the event of a blockage or jamming of objects.

Furthermore according to the invention it is proposed that the massaging movement is regulated by adapting the drive energy in dependence on the ideal speed which is actually specified and/or the ideal moment which is actually specified. The speeds and/or accelerations and/or moments which are constituent parts of the massaging movement are thereby regulated.

The invention is further developed if an actual ideal speed and/or an actual ideal moment is provided in dependence on a characteristic field and/or a mathematical algorithm. In order to obtain a preferred characteristic massage path the actual ideal speed is provided in dependence on a characteristic field. In an advantageous development of the invention the characteristic field thereby has values of the ideal speed registered in a stored matrix and associated with certain events, for example certain points in time or time intervals or one or more positions of the same or different adjusting directions. The characteristic field is thereby preferably adaptable. The adaption can be undertaken in dependence on detected measured values or can be advantageously changed by the user.

A further preferred development of the invention proposes that for regulation the actual updated speed of the drive is measured so that the characteristic massaging movement takes place substantially independently of an actual, time-changeable or locally variable load on the drive. To measure the actual speed the time change of the position in the relevant adjusting direction is evaluated.

In addition the time and/or local path of the ideal speed and/or ideal moment is advantageously specified. These can be for example the ideal acceleration or the time derivations thereof.

In a further development of the invention it is proposed that at least one ideal speed is assigned as the specified target to at least one control time point or control time period in the massage shape. Alternatively or in combination therewith the assignment can also be made to an adjusted position or an adjusted region in the massage shape. The same applies per se on its own or in combination with the previously discussed situation for an ideal moment as well as for a path of the ideal moment or the ideal speed.

A development of this further feature of the invention proposes that for the assignment the actual control time point or control time period or the actual adjusted position or the adjusted range is preferably detected by means of a logic verification. A memory address is determined from this. This memory address can exist for example in a hexadecimal form as a pointer to a memory range. By means of the memory address the associated ideal speed or the associated ideal speed path is retrieved from a memory and loaded for example in a comparison register in the computer unit. Alternatively or in combination therewith the associated ideal moment or associated ideal moment path can be retrieved for this purpose.

A preferred development of this feature of the invention proposes that further parameters, more particularly measured and/or control parameters which are allocated one or more memory values are evaluated by means of the logic verification. The ideal speed can hereby be varied for example in dependence on these measured and/or control parameters. Apart from these parameters an actual position of the adjusting element coupled to the drive can advantageously be evaluated in addition so that the ideal speed is controlled additionally in dependence on this actual position.

In a further preferred embodiment of the method according to the invention the drive movement is automatically controlled in the first adjusting direction in dependence on the drive movement in the second adjusting direction, more particularly in dependence on the position, adjusting time or ideal speed and/or actual speed. In an advantageous development of this further development of the invention both the movement of the first drive and also the movement of the second drive are regulated. This enables the massage shapes to be designed so that they can be substantially reproduced.

According to another further development of the invention it is proposed that the two drive movements are synchronised with each other in the first adjusting direction and in the second adjusting direction in that preferably in positions in which the ideal speed and/or ideal moment are changed one of the two drive movements is stopped until the other of the two drive movements reaches an associated ideal position.

During the operation of the massaging function in an advantageous further development of the invention the updated actual speed of the drive is measured, for example if the actual speed is actually the speed at which the drive shaft of the drive motor is rotating. This can happen for example through evaluating measured signals of a position or speed sensor. Alternatively or in combination the speed can more advantageously be determined from the measured ripple of the drive current and/or from control parameters. The actual speed can hereby deviate from the ideal speed.

As a continuously occurring method step it is advantageously proposed that a drive movement of the drive is adapted in that the drive energy is adapted in dependence on the actual ideal speed and the updated actual speed. The adaption is hereby carried out so that the massaging movement which is characterised for the massage shape through the ideal speeds is controlled substantially independently of an actual, time-changeable or locally variable load of the drive.

According to another aspect of the invention an electronic control device is provided for a lumbar support which has a drive mechanically coupled to an adjusting mechanism for adjusting the seat contour of the lumbar support. The control device can thereby be designed on a semi-conductor chip, as a so-called "smart power solution", thus as an integrated intelligent power electronics, or can consist of several electronic and/or electro-optical structural elements. By control devices of this kind can be meant for example a separate specified electronic device (stand alone), a seat control apparatus (seat memory) for controlling all the seat adjusting devices or a central control device (body controller) which controls a number of functions of the motor vehicle. The control device thereby has at least one computer unit which has a fixed-wired program structure and/or can be freely programmed.

In each case the computer unit is set up through a program for controlling a massaging movement of the lumbar support through several predeterminable ideal parameters, preferably through several different ideal speeds The massaging movement is thereby characterised through these ideal parameters which vary over a massage shape. The lumbar support is an adjusting device with which the contour of the backrest can be significantly affected. For a massaging effect this contour is preferably to be changed temporarily through predeterminable ideal speeds. Several ideal speeds for one or more adjusting directions of the lumbar support, for example in the height or depth of the contoured shape can advantageously be predetermined through the computer unit.

For regulating the massage movement according to this aspect of the invention it is proposed that a drive moment of the drive is adapted to an actual load of the drive so that the massaging movement can be controlled substantially independently of the actual time-changeable or locally variable load. The drive moment is consequently variable through the control device. The actual load of the drive can vary for different reasons. For example the muscle force exerted by the user on the backrest can depending on seat position, reaction of the user or shape of the backrest contour cause an increased or reduced load. Other influencing factors are for example the weight of the occupant and also the increased or reduced sluggishness of the adjusting mechanics of the lumbar support which depends on the adjusting path. The said influencing factors are however not conclusive. Further factors, such as the hardness of the padding or clothing of the user may require an adaption o the drive moment.

In order to obtain a characteristic massage path in a further development of the invention the computer unit is set up to provide the actual ideal speed in dependence on a characteristic field and/or a mathematical algorithm. The characteristic field thereby comprises values of the ideal speed registered in a stored matrix and assigned to specific events, for example certain time points or time interval or one or more positions of other adjusting directions. The characteristic field is thereby preferably adaptable. The adaption can be undertaken in dependence on detected measured values or can advantageously be changed by the user.

Alternatively or in combination therewith the computer unit according to another further development of the invention is set up to produce the actual ideal speed in dependence on a mathematic algorithm. This dependence can furthermore be combined with the allocation through a characteristic field, whereby in one development of the invention the characteristic field data is evaluated through the mathematical algorithm.

Another development of the invention proposes that for a particularly manual adjustment of the lumbar support into a normal position provided for a seat contour the computer unit is set up, deviating from the ideal speeds of the massaging movement to operate the drive with a non-adapted, preferably constant and particularly preferably maximum drive moment.

A further development of the invention proposes a measuring device for determining the updated actual speed of the massaging movement whereby for adapting the drive moment the computer is set up to vary a transmission ratio of a gearing coupled mechanically to the lumbar support in dependence on the actually measured actual speed. Preferably a substantially continuously variable gearing is used for this which enables a sufficiently accurate adaption of the drive moment.

A particularly advantageous further development of the invention comprises at least one power semi conductor for supplying current to the drive whereby an input of the power semi conductor is connected to the computer unit. To vary the electrical drive energy the computer unit is thereby set up to vary the drive current in dependence on the updated actual speed and the updated ideal speed of the massaging movement.

In a particularly preferred further development of the invention the computer unit is set up for measuring one or more physical parameters. A physical parameter is for example a seat occupancy, seated weight, inside room temperature, temperature of the drive or a state of input elements. This physical parameter is evaluated to control the ideal speeds of the computer unit.

The program preferably has for this purpose the following method sequence for controlling the drive of the lumbar support. A massaging movement characterised through predeterminable ideal speeds is thereby controlled in a massage shape of the lumbar support. For this at least one ideal speed associated at least with a control time point or control time interval in the massage shape, or a time path of the ideal speed of a drive of the lumbar support is specified. The specification can be stored for example in a memory. This specification is also adaptable in dependence on adjustment events or measurements or can be changed by the user.

For adjustment into the normal position the contour of the lumbar support must be adjustable as quickly as possible in order to avoid any unnecessarily long adjustment time which the user might find annoying. The massaging movement is significantly longer compared to the adjusting movement so that for one working point of the drive two different speed-increasing or speed-reducing transmission ratios of the gearing would be required for adjusting into the normal position and for the massaging movement. The invention therefore comprises a lumbar support of a motor vehicle seat with an adjusting mechanism which is mechanically coupled to a drive for adjusting the seat contour.

Furthermore the lumbar support has a gearing for coupling which has a speed-increasing or speed-reducing transmission ratio which is designed for adjustment into a normal position of a seat back contour. The adjustment into the desired normal position can thereby be started by press-button operation for example for moving into a memory position. The drive must be operated for a speed reduction or speed increase adapted to the adjustment into the normal position, and with a corresponding slower speed for a massaging movement.

For this a computer unit is provided which is connected for control to the drive whereby the computer unit is set up to control the drive both for adjustment into a normal position and also for a regulated massaging movement. The momentary speed of the massaging movement is hereby variable through the provision of several different ideal speeds and is reduced compared to the adjusting speed during adjustment into the normal position. The momentary speed is thereby a part of the maximum adjusting speed in this adjusted position.

An advantageous development of the lumbar support of a motor vehicle seat of this invention is that the ideal speed is reduced by at least half compared with the adjusting speed. By adapting the adjusting moment to the massaging movement during regulation a further reduction in the massage speed to a quarter can preferably also be achieved.

A particularly advantageous further development of the invention provides that the ideal speed in an adjusting direction is dependent on one or more calculated or measured parameters in a further adjusting direction of the lumbar support In this method a drive movement is at the same time automatically controlled in a first adjusting direction and a second adjusting direction. The automatic control preferably takes place through a control device, for example by means of a program development so that a permanent manual control, for example through actuating an operating switch is unnecessary. The lumbar support has for this a first drive for adjustment in a first adjusting direction and a second drive for an adjustment in a second adjusting direction. In principle different types of drives can be used, such as pneumatic or hydraulic, preferably however electric motor drives are used. An adjustment direction can thereby be any, for example curved, rotational or an adjustment possibility set up along an adjustment path through a drive. Preferably however a linear adjustment is possible each time through a drive. The adjustment directions deviate from each other. Consequently the adjustment through the first drive leads to a different change in the backrest contour than the adjustment through the second drive.

Furthermore it can be proposed that an adjustment movement is comprised of the drive movements in the first adjusting direction and the second adjusting direction. Advantageously the lumbar support of the lumbar support is for this adjustable in the seat back height through the first drive and in the seat back depth through the second drive. Preferably the drive moment at least of this second drive is adapted to take into account the load action in the direction of the seat back depth. The support position is in this case defined through the relevant actual adjusting positions in the first adjusting direction and in the second adjusting direction. The composite adjusting movement is thereby reached by associating the adjustment in the first adjusting direction to the adjustment in the second adjusting direction. In the simplest case the attribute is through the adjusting time in that for example each adjusting time point is allocated an adjusting direction, an adjusting speed or an adjusting acceleration of the relevant drive.

Another dependence is that of the drive movements as attribute. The drive movement of the second drive is thereby controlled in dependence on the first adjusting position and/or the time change of this first adjusting position. The dependence can thereby be programmable as a fixed attribute. Particularly advantageously this dependence can however be changed on the basis of further conditions, more particularly parameters or characteristic values. The time change of the adjusting position is advantageously the adjusting speed or the adjusting acceleration of the first drive during the massage. If for example the second drive serves to adjust the lumbar support in the seat back depth and the first drive to adjust the lumbar support in the seat back height then the seat back depth is controlled in dependence on the actual position of the seat back height.

Advantageously the first adjusting position in the first adjusting direction is determined in the method for controlling the lumbar support. If a mechanically commutated electric motor is used as the drive the adjusting position is advantageously determined from the ripple of the drive current conditioned through the mechanical commutation. A preferred embodiment of this further development of the invention proposes that in order to determine the adjusting position the latter is sensed by means of a sensor system. This position sensor system is in active connection with the drive, preferably through mechanical coupling. The position sensor enables a copying of the adjusting position of the mechanical adjusting path on electronically evaluated signals, for example a voltage signal which correlates with the adjusting position.

Another aspect of the invention is a lumbar support of a motor vehicle seat with a synchronous motor which for adjusting the seat contour is coupled mechanically to the adjusting mechanism more particularly by means of gearing. Moreover a computer unit is provided which is connected to the synchronous motor for control. The computer is set up to control the synchronous motor both for adjustment in to a normal position through an adjusting speed as well as also for a massaging movement through several different predeterminable ideal speeds.

The synchronous motor is preferably structurally designed so that an actual speed corresponds to the massaging movement of the proposed ideal speed and the actual speed is substantially independent of the actual load of the synchronous motor which can be varied in time or position. For this a synchronous motor of this kind is provided which can be controlled in its speed through a frequency control, whereby the motor receives an increased drive current in the event of increased load.

Apart from the control device and the lumbar support, part of the invention is still a digital storage medium, more particularly a diskette or semi-conductor memory, with electronically readable control signals which can interact with a programmable computer unit so that the method previously described for controlling the lumbar support is carried out.

Furthermore part of the invention is still a computer program product with program codes stored on a machine-readable carrier for carrying out the previously described method for controlling the lumbar support when the program product runs on a computer unit, more particularly a micro controller.

A further part of the invention is a computer program with a program code for carrying out the method previously described for controlling the lumbar support when the program product runs on a computer unit, more particularly on a micro controller.

The invention comprises in addition to the principles and means explained also the possible reversals and substitutions for the functions.

The invention will now be explained in further detail with reference to the embodiments illustrated in the accompanying drawings.

Figure 1:
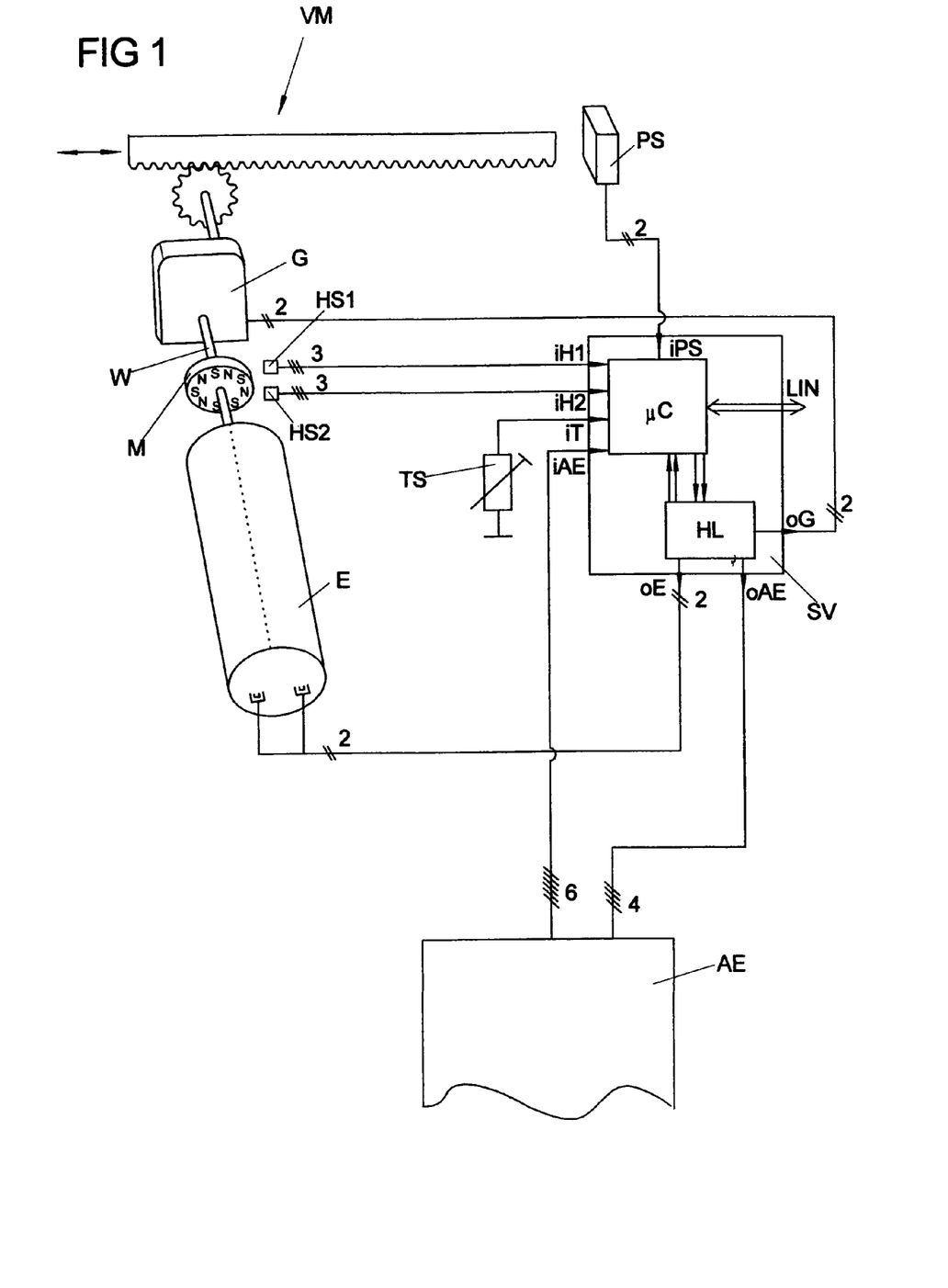
FIG. 1 shows a control device and a drive of the lumbar support of a vehicle seat.

FIG. 1 illustrates a control device SV and a drive E of a lumbar support of a motor vehicle seat. The drive E is a mechanically commutated electric motor E which is connected by two leads to a power output oE of the control device SV. The electric motor E is mechanically coupled to a gearing G through a drive shaft W. The gearing G is in turn in active connection mechanically with the adjusting mechanics VM of the lumbar support. FIG. 1 shows the adjusting mechanism VM diagrammatically with gearwheel and toothed rack.

In order to detect the movement of the lumbar support a measuring system is provided. A part of this measuring system is a ring magnet M mounted on the drive shaft W with circumferentially changing polarity N, S. The rotational movement of this ring magnet M is detected by means of two Hall sensors HS1 and HS2 which are locally off-set relative to each other in the circumferential direction. The rotational direction of the drive E is determined from the phase position of the Hall signals whilst from the time sequence of the detected polarity change it is possible to determine a position of an element of the lumbar support which is to be adjusted, a rotational speed and a rotational acceleration of the drive E. For detection the two Hall sensors HS1 and HS2 are each connected to an input iH1 and iH2 of the control device SV.

Furthermore a position sensor PS is used in order to measure one or more positions of the element of the adjusting mechanism VM which is to be adjusted. By way of example the position sensor PS is an end position switch through which on reaching the end position of the element of the adjusting mechanism VM which is to be adjusted a position signal can be transferred through a signal lead to an input iPS of the control device SV.

Furthermore the control device SV is connected through a lead to the gearing G whereby the gearing G has a continuously variable speed reduction which can be set by the control device SV. By means of the continuously variable gearing G it is possible through the control device SV by varying the reduction ratio to control the moment of the drive device (consisting of the electric motor E and gearing G) which is required in dependence on the existing load.

The control device SV has for measuring and evaluating the sensor signals at the signal inputs iH1, iH2 and iPS, as well as further measuring signal inputs iT and iAE, by way of example one micro controller μC which is connected to the signal inputs iH1, iH2, iPS, iT and iAE. By way of example the micro controller μC is connected to a temperature sensor T. The micro controller μC has analogue inputs and digital inputs which for simplification are not shown in FIG. 1. Furthermore the micro controller μC is connected to a power switch assembly HL for control. The power switch assembly HL consists for example of several semi conductor bridges or relays which enable a controlled supply of current to the electric motor E and gearing G.

The control of the level of the relevant current supply is carried out by the micro controller μC by means of a pulse-width-modulated control signal (PWM) with which one or more power semi conductors of the power switch assembly HL are governed and controlled in dependence on the scanning ratio of the control signal. If so-called sense-FET-power semi conductors or so-called "shunt-resistances" are used, then the mean value as also the ripple of the motor current of the electric motor E can be measured and evaluated for control through the micro controller μC.

Moreover the control device SV is connected to further electronics. A bus system LIN, in the embodiment of FIG. 1 a LIN bus system, is provided for communication with the further electronics. Through the LIN bus system the lumbar support can also be remote-controlled through other control devices, for example a central control device of the motor vehicle or through any other junction of the LIN bus system. Furthermore the control device SV is connected to further drive units AE illustrated in FIG. 1 as the "black-box" for supplying current to motors or gears through power outputs oAE and for measuring movements of these drive units AE by means of sensors (not shown) through measuring inputs iAE.

The micro controller μC of the control device SV illustrated in FIG. 1 is configured with a control program which causes a massaging movement characterised by predeterminable ideal speeds to be controlled in a massage shape of the lumbar support (not shown in FIG. 1). These ideal speeds are stored in a memory (not shown in FIG. 1), more particularly a non-volatile memory of the micro controller μC. The actual updated ideal speed of the drive movement of the electric motor E at that time is retrieved from this memory. Through successively retrieving different ideal speeds the adjusting mechanism VM is moved in the massage shape or as a part of the massage shape which can still be comprised of further movements of further drive units AE.

Apart from constant ideal speeds, time paths, for example ideal speed slopes, are also stored in and retrievable from the memory of the micro controller μC. The ideal speeds are assigned to an adjusting period inside the massage shape. The element of the lumbar support which is to be adjusted is to be adjusted through the adjusting mechanism VM from position A into position B with the ideal speed X. By ideal speed X is hereby meant a guide value of a regulating circuit and by actual speed is meant the regulating value. Therefore by ideal speed X is not to be meant a mean speed which is produced by way of example from a stepped operation. In order to reach the position the ideal speed X is therefore provided and in order to move from position A to position B a requisite adjusting period is to be provided, by way of example 5 seconds.

If during the adjustment it is detected that the actual speed of the electric motor E determined with the Hall sensors HS1 or HS2 does not correspond to the ideal speed, because by way of example the load acting on the adjusting mechanism VM is increased by way of example through an above average heavy user of the vehicle seat, the updated actual speed of the drive is measured and evaluated through the micro controller μC.

In order to reach the desired target position B still within the predetermined adjustment period a drive moment of the drive which consists of the electric motor E and gearing G is adapted by adapting the drive energy through the pulse-width-modulated control signal through the micro controller in dependence on the actual ideal speed and the updated measured actual speed. With the adaption of the drive moment the characteristic massaging movement takes place substantially independently of an actual, time-changeable or locally variable load of the drive. For the desired independence of this speed time control it is possible to use by way of example a P, PI or PID regulating circuit.

So that the micro controller μC can retrieve the currently correct ideal speed from the memory the relevant updated ideal speed or the up-dated time path of the ideal speed is assigned to a control time point or control time interval within the massage shape. Alternatively or in combination an attribute can also be made to a position or a position range. The attribute is undertaken by means of a characteristic field which is entered in the memory of the micro controller μC by way of example as a matrix. The attribute is thereby for example dependent on a time value of a timer (not shown in FIG. 1) of the micro controller μC which in turn is assigned to a time point within the massage shape.

Figure 3:
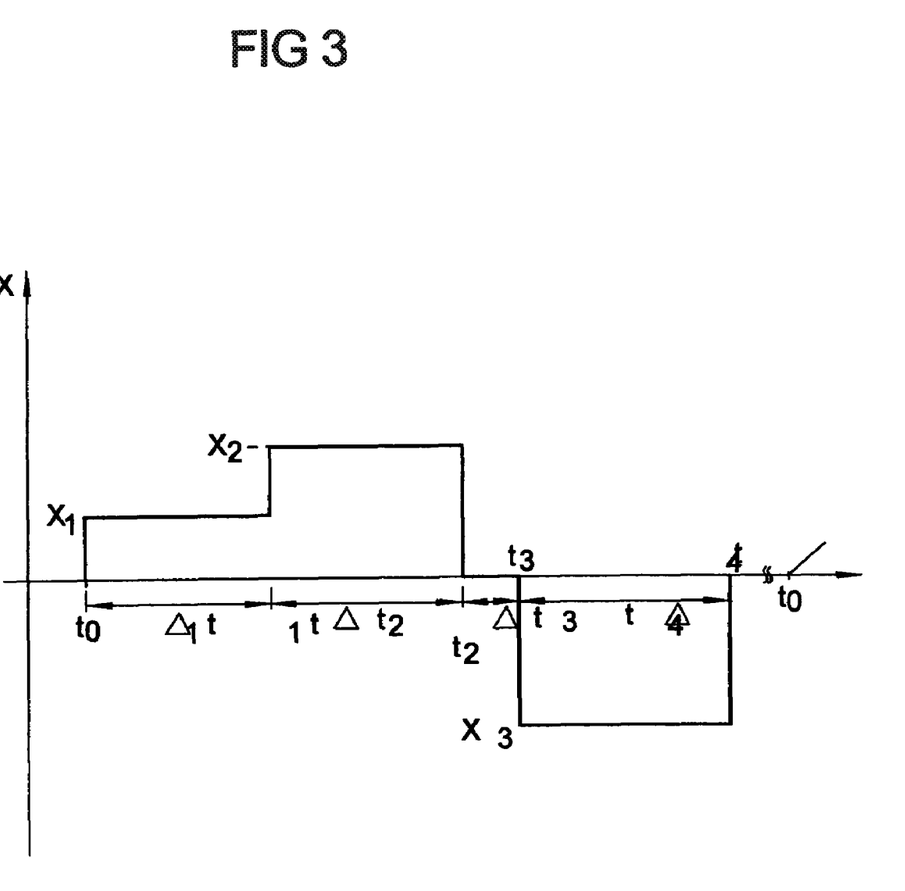

A sequence of ideal speeds of the electric motor E is shown diagrammatically as a time chart as an embodiment in FIG. 3. This meets with the idea that at least one ideal speed is different from the maximum speed (with the supply of the entire battery voltage to the drive motor) and the zero speed. The massaging movement starts at time point $t_0$. The massaging movement is started by way of example through the actuation of a massage button by the user at this time point to. The first ideal speed $X_1$ and the first adjustment period $\Delta t_1$ are retrieved from the memory of the micro controller μC. As a result of the fixed first ideal speed $X_1$ and the first adjustment period $\Delta t_1$, within this time a certain adjusted position is reached provided by means of the ideal speed/adjustment period ratio, independently of which load conditions prevailed inside this adjustment period $\Delta t_1$.

With the end of the first adjustment period $\Delta t_1$ the next following speed time pairing $\Delta t_2$ and $X_2$ are retrieved from the memory which is allocated to the end of the first adjustment period $\Delta t_1$ at time point $t_1$. During the second adjustment period $\Delta t_2$ the same drive is further adjusted with the second ideal speed $X_2$ which is raised relative to the first ideal speed $X_1$. The time-path integral of the two adjustment times $\Delta t_1$ and $\Delta t_2$ is selected by way of example so that the element of the lumbar support which is to be adjusted substantially reaches the previously mentioned point B. At point B this movement in this adjusting direction is stopped for the rest time $\Delta t_3$. The element of the lumbar support to be adjusted is then moved back with the ideal speed $X_3$ within the adjustment period $\Delta t_2$ into the starting position A which is reached at time point $t_4$. Inside the massage shape the element adjusted by the electric motor E is thus moved back between the time points $t_0$ and $t_4$ from the starting position A to the position B and back. At the same time further adjustments of the massage shape can be generated through the drive AE so that the massage shape consists of several drive movements, as described in the following in the embodiment relating to FIG. 2.

That the massaging movement is substantially independent of the updated time or locally variable load means in this concrete embodiment that through an adjustment with the specification of the ideal speed $X_1, X_2, X_3$ the desired adjustment position A, B to be achieved within the predetermined adjustment time $t_1, t_2, t_4$ is achieved with a small position error and the drive E does not come to a standstill during the adjustment even in the case of a high load.

This also applies for the further following massaging movement which starts at the time point $t_0'$. In FIG. 3 thereby only the start of the massaging movement is shown. The path of the ideal speed X is a rising slope. So that even with slow speeds of the slope a movement of the drive and thus of the lumbar support is ensured, the drive moment is correspondingly increased particularly for the slow speeds of the slope. A slope dropping down to a stationary state of the drive movement is not shown in FIG. 3. The adaption of the drive moment however similarly applies for a downward slope. Both types of slope in this concrete embodiment have the advantage that the drive and the mechanics are protected from mechanical impact loads and nevertheless the ideal speed/adjustment time ratio enables a desired adjustment position to be achieved within the massage shape.

Figure 2:
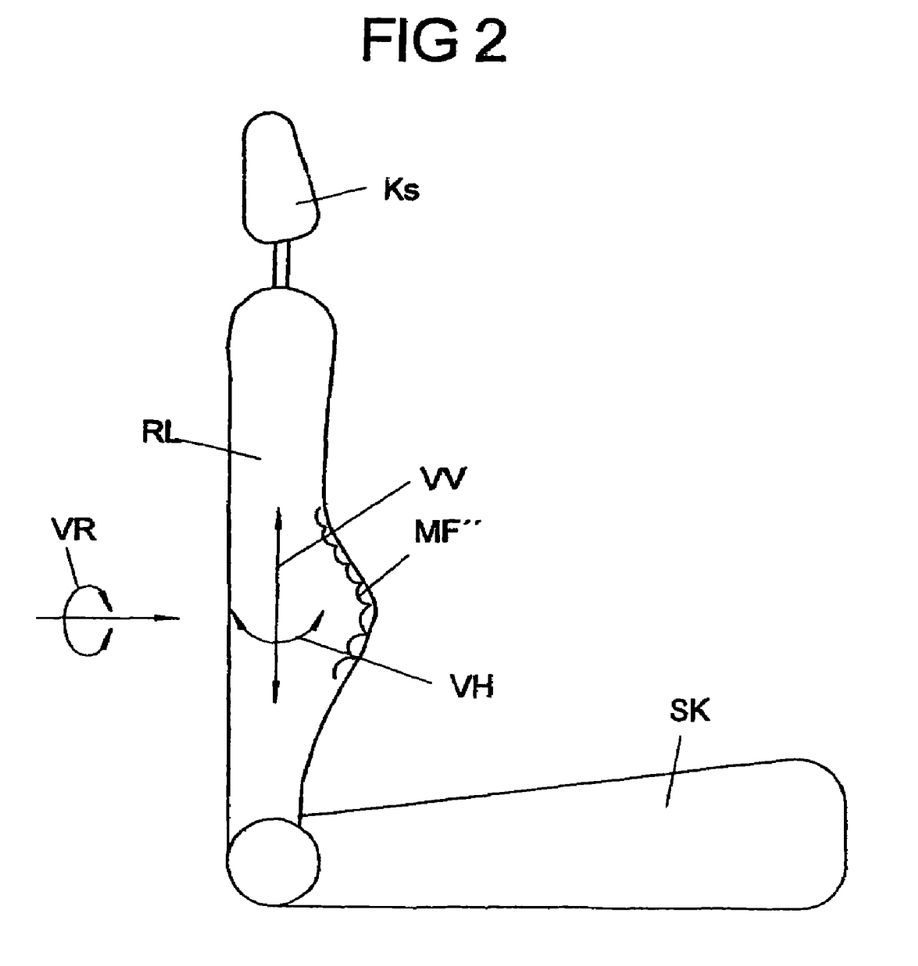
FIG. 2 shows a diagrammatic view of a motor vehicle seat with three adjusting directions for the lumbar support and FIG. 3 shows a diagrammatic view of an example of a sequence of different ideal speeds of a drive in a massage shape.

In the embodiment illustrated in FIG. 2 the control device SV is connected through two driver outputs oE and oAE by means of several cables each to a drive LAH and LAV of the lumbar support. The drives LAH and LAV adjust the element of the lumbar support which is to be adjusted in two directions which differ from each other (VH and VV). As shown in FIG. 2 the direction VV thereby enables an adjustment movement in the seat back height, i.e. inside the backrest RL in the direction of the head restraint KS, whilst the direction VH can be formed substantially transversely thereto, the lumbar support is consequently adjustable substantially in the seat back depth.

FIG. 2 thereby shows diagrammatically a motor vehicle seat with a seat cushion SK, a backrest RL and a head restraint Ks. The lumbar support is mounted in the backrest RL, (not shown in FIG. 2). The lumbar support has in this embodiment of the invention three adjusting directions VH, VV and VR. The adjusting direction VV extends in the plane of the backrest RL and enables an adjustment along a part of the length of the spinal column of the user. The adjustment direction VV is thereby formed in a straight line.

The adjustment direction VH deviates from the adjustment direction VV in the sense that this is aligned in the embodiment at an angle to the adjustment direction VV. The adjustment direction VH enables the pronounced form of the seat contour protrusion to be set through the lumbar support. In the illustrated embodiment this adjustment is carried out along a curved adjusting path. These two and the following third adjustment direction VR are thereby adjustable mechanically independently of each other through the relevant drive. The adjustments are therefore coupled together so that these adjustment directions are connected mechanically to one and the same support element of the lumbar support.

The third adjustment direction VR is designed in particular for a specific massaging function. It enables a circular rotational movement of the support element of the lumbar support which is to be adjusted. In combination with the other two adjustment directions VV and VH it is possible to program complex massage shapes. A complex movement of this kind is diagrammatically illustrated through the massage shape MF″ which can also be configured in dependence on the previously set position or memory position so that the massage shape is adapted to the contour of the seat in the desired normal position (before and after massage).

LIST OF REFERENCE NUMERALS

| | |
|---|---|
| E | Electric motor |
| W | Drive shaft |
| M | Ring magnet |
| G | Stepless gear |
| VM | Adjustment mechanism |
| HS1, HS2 | Hall sensor |
| PS | Position sensor |
| TS | Temperature sensor |
| SV | Control device, door control device |
| □C | Micro controller |
| HL | Power switch, semi conductor bridge |
| AE | Drive electronics |
| IH1, iH2, iT, iPS, iAE | Inputs, analogue or digital |
| oE, oG, oAE | Outputs, power outputs |
| LIN | LIN bus link |
| Ks | Head restraint |
| RL | Backrest |
| SK | Seat cushion, seat trough |
| VV, VR, VH | Adjustment directions |
| MF″ | Massage shape |
| X, $X_1$, $X_2$, $X_3$ | Ideal speed |
| $\Delta t_1$, $\Delta t_2$, $\Delta t_3$, $\Delta t_4$ | Adjustment period within the massage shape |
| $t_0$, $t_1$, $t_2$, $t_3$, $t_4$, $t_0'$ | Time point within the massage shape |
| t | Time |

The invention claimed is:

1. A method for controlling a drive for a lumbar support of a motor vehicle seat, comprising:
   having a massaging movement of the lumbar support being controlled so that at least one of
   several different ideal speeds and ideal moments are provided which define a massage shape of the massaging movement; and
   having the massaging movement being regulated so that drive energy is adapted depending on at least one of an actual ideal speed and an actual ideal moment.

2. The method according to claim 1 wherein at least one of the actual ideal speed and the actual ideal moment are specified depending on at least one of a characteristic field and a mathematical algorithm.

3. The method according to claim 1 or 2 wherein for regulating, an updated actual speed of the drive is measured so that the massaging movement takes place substantially independently of at least one of an actual, time-changeable and locally variable load of the drive.

4. The method according to claim 1, wherein additionally at least one of time, a local path of the ideal speed and ideal moment is specified.

5. The method according to claim 4 wherein for the specified at least one ideal speed, one ideal moment and the path thereof is attributed to at least one of a control time point, a control time period, an adjustment position and an adjustment region in the massage shape.

6. The method according to claim 5 wherein for the attribute at least one of an actual control time point, the control time period, an actual adjustment position and the adjustment region is determined by logic verification and from this a memory address is determined and from a memory the at least one of the associated ideal speed, an associated ideal speed path, the associated ideal moment and the associated ideal moment path is retrieved.

7. The method according to claim 6 wherein by the logic verification, further values are evaluated.

8. The method according to claim 7 wherein the further values comprise at least one of measured and control values to which are assigned to at least one memory value.

9. The method according to claim 1 wherein the ideal speed of the massaging movement is continuously varied and is reduced compared to an adjustment speed of an adjustment into a normal position.

10. The method according to claim 9 wherein the ideal speed is reduced at least in sections by at least about thirty percent compared to the adjustment speed.

11. The method according to claim 9 wherein the ideal speed is reduced at least in sections by about fifty percent compared to the adjustment speed.

12. The method according to claim 1 wherein the ideal speed is additionally controlled depending on an actual position of an adjustment element coupled to the drive.

13. The method according to claim 1 whereby the lumbar support has a first drive for an adjustment in a first adjustment direction and a second drive for an adjustment in a second adjustment direction and the first and second adjustment directions differ from each other, wherein for control a drive movement is automatically controlled at about the same time in the first adjustment direction and in the second adjustment direction.

14. The method according to claim 13 wherein both the movement of the first drive and the movement of the second drive are regulated.

15. The method according to claim 13 or 14 wherein the drive movement is controlled in the first adjustment direction depending on at least one of a position, adjustment time, ideal speed and actual speed in the second adjustment direction.

16. The method according to claim 13 or 14 wherein the drive movement is controlled, namely in the first adjustment direction depending on the drive movement in the second adjustment direction.

17. The method according to claim 16 wherein the two drive movements in the first adjustment direction and in the second adjustment direction are synchronized relative to each other such that in positions in which at least one of the ideal speed and ideal moment are changed, one of the two drive movements is stopped until the other of the two drive movements has reached an associated ideal position.

18. A lumbar support of a motor vehicle seat, comprising:
an adjusting mechanism which is mechanically coupled to a drive for adjusting a seat contour;
a gearing for coupling which has at least one of a gear transmission ratio and gear speed reduction which is designed for adjustment into a normal position of the seat contour;
a computer unit which for control is connected to the drive wherein the computer unit is set up to control the drive both for adjustment into a normal position and for a regulated massaging movement wherein a momentary speed of the massaging movement is variable through specification of several different ideal speeds and is reduced compared with an adjusting speed of the adjustment into the normal position.

19. The lumbar support of a motor vehicle seat according to claim 18 wherein an ideal speed is reduced by about at least half compared with the adjusting speed for adjustment into the normal position.

20. The lumbar support of a motor vehicle seat according to claim 18 wherein the ideal speed in one adjustment direction is dependent on at least one of calculated and measured parameters of a further adjustment direction of the lumbar support.

21. A lumbar support of a motor vehicle seat, comprising:
an adjusting mechanism for adjusting a seat contour;
a motor which for adjusting the seat contour is coupled to the adjusting mechanism mechanically; and
a computer unit which for control is connected to the motor wherein the computer unit is set up to control the motor both for the adjustment into a normal position through an adjusting speed and for a massaging movement through several different predeterminable ideal speeds wherein the motor is structurally designed so that an actual speed of the massaging movement corresponds to the predetermined ideal speed.

22. The lumbar support of claim 21, wherein the motor is coupled to the adjustment mechanism by gearing.

* * * * *